US006513487B1

(12) United States Patent
Jorach et al.

(10) Patent No.: US 6,513,487 B1
(45) Date of Patent: Feb. 4, 2003

(54) METHOD FOR OPERATING A RECIPROCATING-PISTON INTERNAL COMBUSTION ENGINE

(75) Inventors: Rainer Werner Jorach, Remseck-Aidlingen (DE); Alois Raab, Böbingen (DE); Eckart Schloz, Marbach (DE); Martin Schnabel, Aalen (DE); Friedrich Wirbeleit, Esslingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/546,057

(22) Filed: Apr. 10, 2000

(30) Foreign Application Priority Data

Apr. 13, 1999 (DE) .......................................... 199 16 485

(51) Int. Cl.$^7$ ................................ F02B 3/00; F02F 3/26
(52) U.S. Cl. ....................... 123/299; 123/305; 123/307; 123/269; 123/276; 123/279
(58) Field of Search ................................. 123/261, 269, 123/276, 279, 298, 299, 300, 305, 307; 239/466, 472, 497, 533.12

(56) References Cited

U.S. PATENT DOCUMENTS

| 3,339,848 A | * | 9/1967 | Geiger ...................... 239/453 |
| 4,195,783 A | | 4/1980 | Hulsing ................... 239/533.3 |
| 4,338,898 A | * | 7/1982 | Bauder et al. ........... 123/193.4 |
| 4,497,309 A | * | 2/1985 | Ivanchenko et al. ........ 123/276 |
| 4,919,093 A | * | 4/1990 | Hiraki et al. ................. 123/299 |
| 5,029,563 A | * | 7/1991 | Guodong ...................... 123/262 |
| 5,078,107 A | * | 1/1992 | Morikawa ................... 123/295 |
| 5,271,362 A | * | 12/1993 | Kobayashi et al. ......... 123/299 |
| 5,497,947 A | * | 3/1996 | Potz et al. ............. 239/533.12 |
| 5,520,157 A | * | 5/1996 | Pontoppidan ............... 123/432 |
| 5,645,225 A | * | 7/1997 | Hasegawa et al. ..... 239/533.12 |
| 5,826,801 A | * | 10/1998 | Kobayashi et al. .... 239/533.12 |
| 5,868,112 A | * | 2/1999 | Mahakul et al. ............. 123/263 |
| 5,899,389 A | * | 5/1999 | Pataki et al. .............. 239/533.2 |

(List continued on next page.)

FOREIGN PATENT DOCUMENTS

| DE | 42 28 359 | 12/1993 | |
| DE | 44 24 117 | 1/1995 | |
| DE | 43 25 904 | 2/1995 | |
| DE | 43 40 883 | 6/1995 | |
| DE | 196 06 087 | 8/1996 | |
| DE | 197 30 399 | 9/1998 | |
| GB | 1 521 065 | 8/1978 | |
| JP | 193535 | * 7/1996 | ........... F02D/41/04 |
| JP | 312501 | * 11/1996 | ........... F02M/61/14 |

OTHER PUBLICATIONS

D. Potz, et al., "Variable Orifice Geometry Verified on the Two-Phase Nozzle (VRD)", Society of Automotive Engineers Paper No. 950081, 1995, pp. 53–63.

Y. Iwabuchi, et al., "Trial of New Concept Diesel Combustion System—Premixed Compression-Ignited Combustion", Society of Automotive Engineers Paper No. 1999-01-0185, 1999, pp. 43–52.

T. Hashizume, et al., Combustion and Emission Characteristics of Multiple Stage Diesel Combustion, Society of Automotive Engineers Paper No. 980505, 1998, pp. 45–55.

Primary Examiner—Tony M. Argenbright
Assistant Examiner—Hai H Huynh
(74) Attorney, Agent, or Firm—Kenyon & Kenyon (57) ABSTRACT

A method for operating a reciprocating-piston internal combustion engine, having an injector nozzle operable by a single valve element and configured to directly inject a fuel into a combustion chamber and having a piston including a piston crown and a piston recess, includes the steps of injecting the fuel by the injector nozzle into the combustion chamber in the form of separated jets of the fuel having different inclinations relative to a top surface of the piston crown and selectively setting the inclinations of the fuel jets depending on an engine load.

4 Claims, 6 Drawing Sheets

U.S. PATENT DOCUMENTS

| | | | | |
|---|---|---|---|---|
| 5,941,208 A | * | 8/1999 | Biemelt et al. | 123/295 |
| 5,947,389 A | * | 9/1999 | Hasegawa et al. | 239/533.2 |
| 5,996,558 A | * | 12/1999 | Ouellette et al. | 123/506 |
| 6,032,637 A | * | 3/2000 | Mamiya et al. | 123/295 |
| 6,095,113 A | * | 8/2000 | Nogi et al. | 123/295 |
| 6,095,437 A | * | 8/2000 | Nozawa et al. | 239/407 |
| 6,105,550 A | * | 8/2000 | Nieberding | 123/294 |
| 6,161,518 A | * | 12/2000 | Nakakita et al. | 123/298 |
| 6,161,782 A | * | 12/2000 | Heinbuck et al. | 239/585.1 |
| 6,338,445 B1 | * | 1/2001 | Lambert et al. | 137/630.22 |
| 6,279,840 B1 | * | 8/2001 | Buckley | 239/533.12 |
| 6,308,684 B1 | * | 10/2001 | Konishi | 123/432 |

* cited by examiner

METHOD FOR OPERATING A RECIPROCATING-PISTON INTERNAL COMBUSTION ENGINE

FIELD OF THE INVENTION

The present invention relates to a method for operating a reciprocating-piston internal combustion engine.

BACKGROUND OF THE INVENTION

In modern, fast-running reciprocating-piston internal combustion engines, which work with diesel fuel and self-ignition, the fuel is injected directly into a working chamber, which usually includes a piston recess. The injected fuel forms a more or less homogeneous mixture of diesel fuel and air, the throttle load of the reciprocating-piston internal combustion engine being regulated by varying the injected fuel quantity. The fuel-air mixture ignites when an ignitable mixture is present in the working chamber and when the compression temperature in the working chamber reaches or exceeds the self-ignition temperature of the fuel-air mixture.

To achieve a complete combustion, one strives to efficiently distribute the fuel with respect to the air charge. If the fuel is homogeneously distributed with respect to the air charge of the working chamber, forming a homogenous fuel-air mixture, one runs the risk in the light load range of the reciprocating-piston internal combustion engine, when a small fuel quantity meets with a large air charge in the working chamber, of the ratio of fuel to air not meeting the condition for ignitability at any location in the working chamber. On the other hand, in the full-load range of the reciprocating-piston internal combustion engine, when a large quantity of fuel is uniformly distributed over the air charge in the working chamber, one runs the risk of the conditions for ignition being met at many locations in the working chamber, so that the fuel burns with a rapid, substantial pressure rise and with numerous pressure peaks, resulting in combustion knocking.

It is known to distribute the fuel heterogeneously over the air charge to achieve a well-balanced combustion. In this context, zones of overly enriched fuel-air mixtures are formed in the working chamber, which develop into ignitable mixtures due to the movement of air in the working chamber, resulting in a uniform combustion.

In this type of heterogeneous combustion, the lack of air in the rich zones leads to particulate emission, and the combustion in stoichiometric zones leads to thermal $NO_x$-formation. Burning a homogeneous, lean fuel-air mixture greatly reduces $NO_x$ and particulate formation, as has already been established. Lean mixtures of this kind can only be burned by self-ignition, since an externally supplied spark ignition is not possible because of the overly lean mixture. Engine operation with a homogeneous, self-ignited mixture is only possible within a limited load range. The potential load range is upwardly limited by the very high conversion rates of self-ignited, homogeneous mixtures. The lower limit is determined by the self-ignition limit of the lean mixture.

SAE Paper 980505, 1998, by Hashizume, T., Miyamato, T., Akagawa, H., Tsujimura, K.: "Combustion and Emission Characteristics of Multiple Stage Diesel Combustion", describes increasing the load of a reciprocating-piston internal combustion engine that works with homogeneous self-ignition by injecting the fuel in two phases. In this context, injector nozzles, through which fuel is injected in a first phase to form a homogeneous mixture, are arranged laterally in the combustion chamber. In a second phase, the fuel is injected through a centrally arranged, conventional six- or eight-orifice nozzle to form a heterogeneous mixture. A method of this kind requires substantial outlay for construction and control engineering.

Also, SAE Paper 950081, 1995, Potz, D., Kreh, A., Warga, J.: "Variable-Orifice Geometry Verified on the Two-Phase Nozzle (VRD)", describes injecting fuel via a two-phase nozzle into the working chamber. This is an injector nozzle that opens to the outside and has two rows of orifices arranged one over the other in the opening direction. The nozzle is used for conventional, heterogeneous diesel combustion. The use of small orifices improves the mixture formation, since injection pressure is increased in the case of a small injection quantity. When working with a large injection quantity, too long of a spray duration is prevented by opening the second orifice row.

At a light load, the two-phase nozzle opens just wide enough to permit the fuel to be injected via an orifice row, while at a heavy load, the fuel arrives in the working chamber via the two orifice rows. The nozzle orifices of the first orifice row run essentially in parallel to the nozzle orifices of the second orifice row, so that they have the same angle of inclination with respect to the piston crown.

SAE 1999-01-0185, Iwabuchi, Y., Kawai, K., Shoji, T., Takeda, T.: "Trail of New Concept Diesel Combustion System—Premixed Compression-Ignition Combustion—", describes reducing the penetration depth of injection jets in a conventional injector nozzle, by configuring the two nozzle orifices in such a way that the injection jets are targeted to hit one another at a specific distance from the nozzle orifices. The collision of the two injection jets has the effect of reducing the linear momentum of the individual jets, diminishing the diameter of the fuel droplets in the jet, and of expanding the jet. This prevents fuel from accumulating at the cylinder wall and, at the same time, the injection jet covers a greater volume of air.

In addition, German Patent No. 42 28 359 Al, describes an injector nozzle for internal combustion engines, which opens to the outside and, in the opening direction, has elongated orifice cross-sections. Here, the intention is to produce injection jets having a sharply concentrated flow profile and a constant flow angle. In addition, by configuring the openings with respect to the sealing surface of a closing head to be offset from the opening direction, it is ensured that sharply concentrated spray jets are not formed in response to a low fuel discharge pressure, i.e., a low speed, until the valve needle has run through an idle stroke. The valve needle is opened by the pressure of an injection pump, oppositely to the force of a closing spring. The time characteristic of the injection is able to be influenced in conjunction with the form design of the nozzle orifice cross-sections, with the closing spring characteristic, and with the pump rate.

Finally, German Patent No. 43 25 90 4 C2 describes a fuel injection system in which a high-pressure pump delivers the fuel into a supply line common to all injector nozzles. Actuators which are driven by an electronic control unit and which work in accordance with a piezoelectric or magnetostrictive principle, act directly or via a transmission element, on a valve needle of the injector valve that opens to the outside, the orifice cross-sections having an elongated and rectangular shape in the opening direction.

SUMMARY OF THE INVENTION

An object of the present invention is to improve the mixture formation over the operating range of a reciprocating-piston internal combustion engine having direct fuel injection, with little outlay for construction.

The present invention provides a method for operating a reciprocating-piston internal combustion engine, where an injector nozzle, which opens toward a working chamber, injects fuel directly into the working chamber, which is formed in a cylinder between a cylinder head and a piston and includes a piston recess. In a light part-load range (37), to produce a heterogeneous mixture, the fuel is injected centrally into the piston recess (6) shortly before the top dead center (12), at a flat angle ($\alpha$) to the piston crown (7). In a subsequent part-load range (35), to produce a homogeneous mixture, the fuel is injected within one range, at least partially at a steeper angle ($\beta$) to the piston crown (7), and that in a full-load range (36), a portion of the fuel is injected, initially to produce a homogeneous mixture, within a range of 180° to 20° crank angle ($\phi$) before the top dead center (12), at a steeper angle ($\beta$) to the piston crown (7). To produce a heterogeneous mixture, the remainder of the fuel is injected within a range around the top dead center (12), at a flatter angle ($\alpha$) to the piston crown (7), into the piston recess (6).

In accordance with the method of the present invention, to produce a heterogeneous mixture in a light, part-load range, the fuel is initially injected centrally into the piston recess shortly before the top dead center, at a flat angle to the piston crown. This ensures that an ignitable mixture is formed even when working with fuel quantities that are small in relation to the air charge. In a heavier, part-load range, to produce a homogeneous mixture, the fuel is injected clearly before the top dead center within a range of 180° to 20° crank angle before the top dead center, partly at a steeper angle to the piston crown. In this manner, it is uniformly distributed over the air charge of the working chamber, so that a substantially homogeneous, lean mixture is produced. In the full-load range, when the fuel quantity to be injected is very large in relation to the air charge in the working chamber, the fuel is injected in several phases and, in fact, in a first phase clearly before the top dead center, within a range of 180° to 20° crank angle before the top dead center, at a steep and flat angle to the piston crown, with a substantially homogeneous mixture formation; and, in a further phase, to produce a heterogeneous mixture, within a range around the top dead center, at a flatter angle to the piston crown. The first-phase injection can also be carried out as a timed, i.e., for example, 5-fold injection. In this manner, at the instant when the compression temperature reaches the ignition temperature, the aim is to have only a limited quantity of ignitable fuel-air mixture, which, on the one hand, renders possible a complete combustion, but, on the other hand, does not produce combustion knocking. The heterogeneous mixture formation prevents the later injected fuel from burning with any excessive pressure rises.

Alternatively to the multi-phase injection in the heavy part-load range and in the full-load range, a single-phase injection can also be used in these load ranges. In this context, as in the light part-load at a flat angle, the injection is carried out shortly before the top dead center, to produce the heterogeneous mixture.

The method in accordance with the present invention can be carried out using only one injector nozzle, which produces injection jets having different angles of inclination to the piston crown. In this context, the inclination of the fuel jets can be selectively set, on the one hand, by providing a plurality of, preferably two, rows of throttle orifices, offset from one another in the opening direction of the valve needle, with those throttle orifices more distant from the needle head exhibiting a steeper angle to the piston crown than the more proximate ones, or by having the angle of the jet vector of injection jets to the piston crown be variable with the opening stroke. To ensure that in the first case, the injection jets having the steeper angle to the piston crown do not intersect the flatter injection jets, it is expedient for the throttle orifices to be offset in the circumferential direction, accordingly.

In the second case, the flow vector can be easily modified by providing elongated opening cross-sections of the nozzle orifices in the opening direction. Given a partially open orifice cross-section, the injection jet is deflected by the leading edge in the direction of the piston crown, forming a steeper jet vector, while given a completely open orifice cross-section, the jet vector is level with respect to the piston crown. The valve seat surface on the needle head is expediently brought back to the point where it does not hinder the deflection of the injection jets having a steeper angle to the piston crown.

In the second case, the nozzle orifices are to be so arranged, without being offset from one another, that the injection jets located above, and configured at a steeper angle $\beta$, are specifically targeted to hit the injection jets, located below, at a distance. The targeted collision of the two jets clearly reduces the absolute penetration depth of the fuel. This makes it possible to prevent fuel from accumulating at the wall, in the event of injection at early crank angles against low combustion chamber pressure. At the same time, once the collision occurs, the injection jet continues to break up perceptibly, so that smaller fuel droplets are formed and a larger air volume is covered.

The diameters of the lower and upper throttle orifices on the one hand and the jet's cone of dispersion angle on the other hand must be specifically adjusted to one another.

To uniformly cover the entire air charge of the working chamber to form a homogenous mixture, it is advantageous that the opening of the valve needle be controlled in intervals during an injection. Both the edge areas of the working chamber, as well as the central areas of the piston recess, are optimally covered by the different angles of the injection jets and jet vectors. The injection jets are expediently driven by an electronic control unit via piezoelectric or magnetostrictive actuators, directly or with the interconnection of a transmission element.

Other advantages are derived from the following description of the drawings. An exemplary embodiment of the present invention is illustrated in the drawings. The specification and the claims include numerous features in various combinations. It is beneficial for one skilled in the art to consider these features individually, as well, and to conceive of other useful combinations.

DETAILED DESCRIPTION

Figure 1:
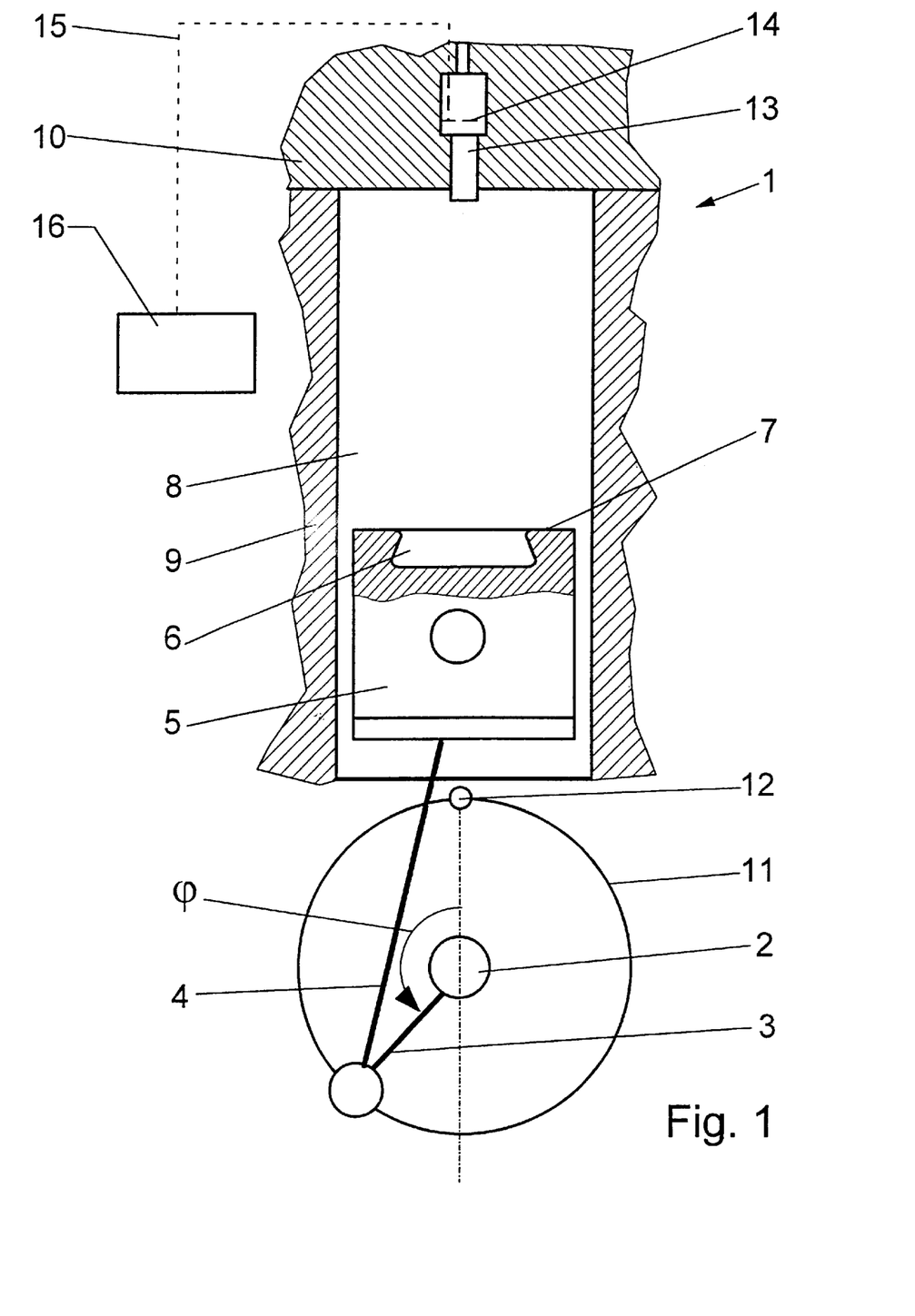
FIG. 1 shows a schematic cross-section through a reciprocating-piston internal combustion engine.

As shown in FIG. 1, in a reciprocating-piston internal combustion engine 1, a piston 5, guided in a cylinder 9, operates crank 3 of a crankshaft 2 via a connecting rod 4. Between piston 5 and a cylinder head 10, a working chamber 8, which includes a piston recess 6 inset in piston crown 7, is formed in cylinder 9.

In response to the clockwise rotation of crank 3 in a crank circle, working chamber 3 is reduced in size, compressing the air trapped within it. The charge is exchanged in working chamber 8 via gas exchange valves and gas channels in cylinder head 10 (not shown in greater detail).

When top dead center 12 of crank 3 is reached, this signifies the end of the compression. Working chamber 8 is at its smallest volume, and the highest compression temperature is attained. The current position of piston 5 with respect to cylinder head 10 is defined by crank angle φ in relation to top dead center 12.

An injector nozzle 13 is arranged centrally with respect to the base area of cylinder 9 in cylinder head 10 and projects slightly into working chamber 8. It has an actuator 14 which works magnetostrictively or piezoelectrically, acts upon a valve needle 21 of injector nozzle 13, and is driven via a single line 15 by an electronic control unit 16 of the engine management.

Figure 2:
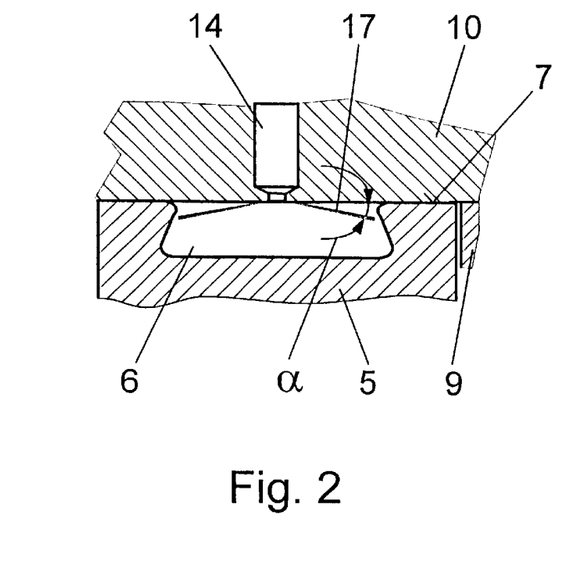
FIG. 2 shows a fuel injection in a light part-load range.
Figure 10:
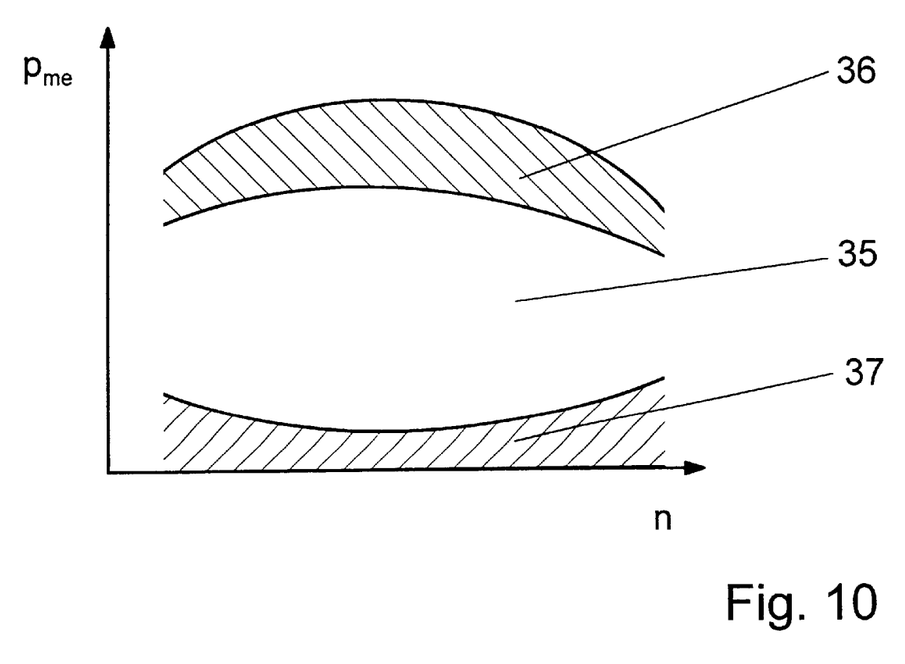
FIG. 10 shows a schematic characteristics map of a reciprocating-piston internal combustion engine, where the average indexed pressure $P_{me}$ is plotted over the speed.

FIG. 2 depicts the fuel injection in a light part-load range 37 (FIG. 10). Piston 5 is located in the area of top dead center 12, while injector nozzle 13 injects the fuel into piston recess 6 to form a heterogeneous mixture. In this context, injection jets 17 form a small angle α with respect to piston crown 7. In part-load range 35 (FIG. 10), injector nozzle 13 distributes the fuel substantially homogeneously over the air charge of working chamber 8. In this context, the start of fuel injection is perceptibly earlier. The fuel is simultaneously injected by way of fuel jets 17 at a small angle α, these fuel jets reaching into the edge areas of working chamber 8, and by way of fuel jets 19 having a steeper angle β, which covers the central area, inclusive of piston recess 6.

Figure 3:
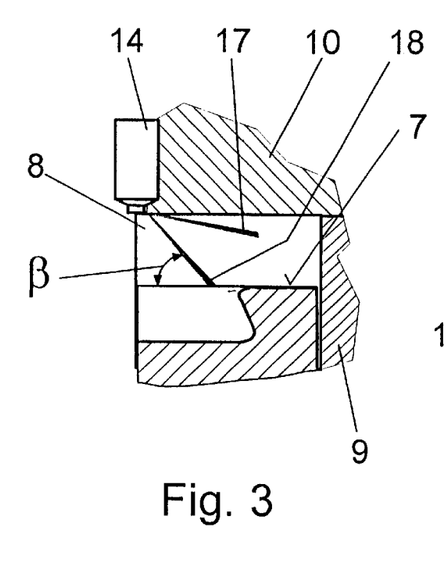
FIG. 3 shows a fuel injection in a medium part-load range.
Figure 4:
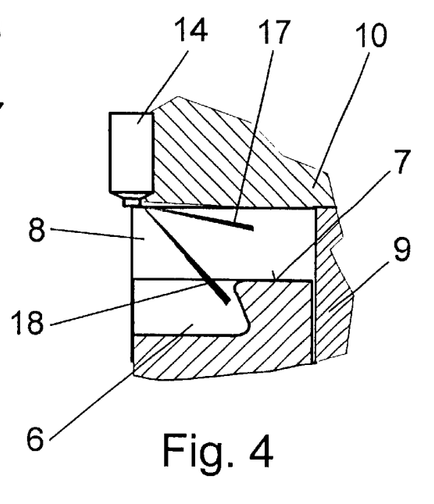
FIG. 4 shows the first phase of a fuel injection in a heavy part-load or full-load range.

In the heavy part-load range and in the full-load range 36 (FIG. 10), the fuel is introduced in a plurality of, preferably two, phases. In fact, the first phase can also be a timed phase, i.e., in which there are multiple injections of small quantities (FIG. 4), this phase essentially corresponding to the homogeneous mixture preparation in accordance with FIG. 3; and, in a second phase in accordance with FIG. 5, which essentially corresponds to the heterogeneous mixture preparation in accordance with FIG. 2.

Figure 5:
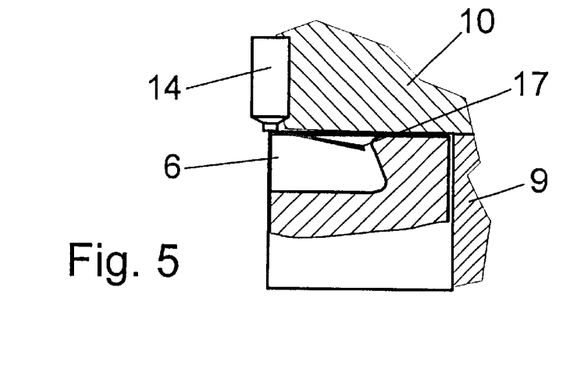
FIG. 5 shows the second phase of a fuel injection in a heavy part-load or full-load range.

Alternatively to the multi-phase injection in the heavy part-load range and in the full-load range, a single-phase injection can also be used in these load ranges, i.e., to form a heterogeneous mixture, all of the fuel is injected within the range of the top dead center at a small angle α in accordance with FIG. 5.

Figure 6:
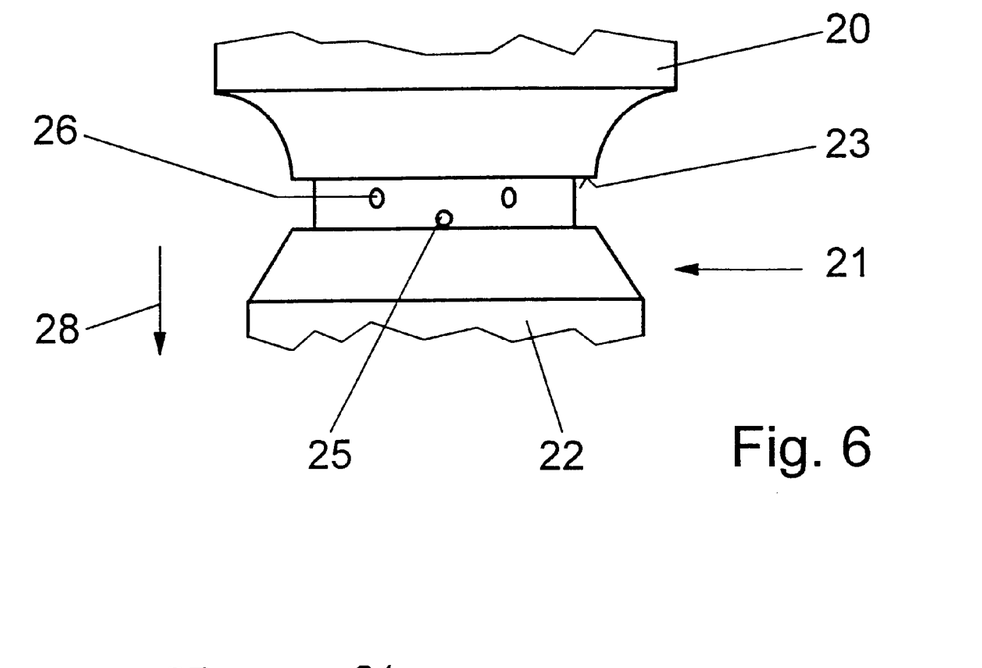
FIG. 6 shows a partial view of an injector nozzle having a plurality of spray-discharge channels, offset in the opening direction.
Figure 7:
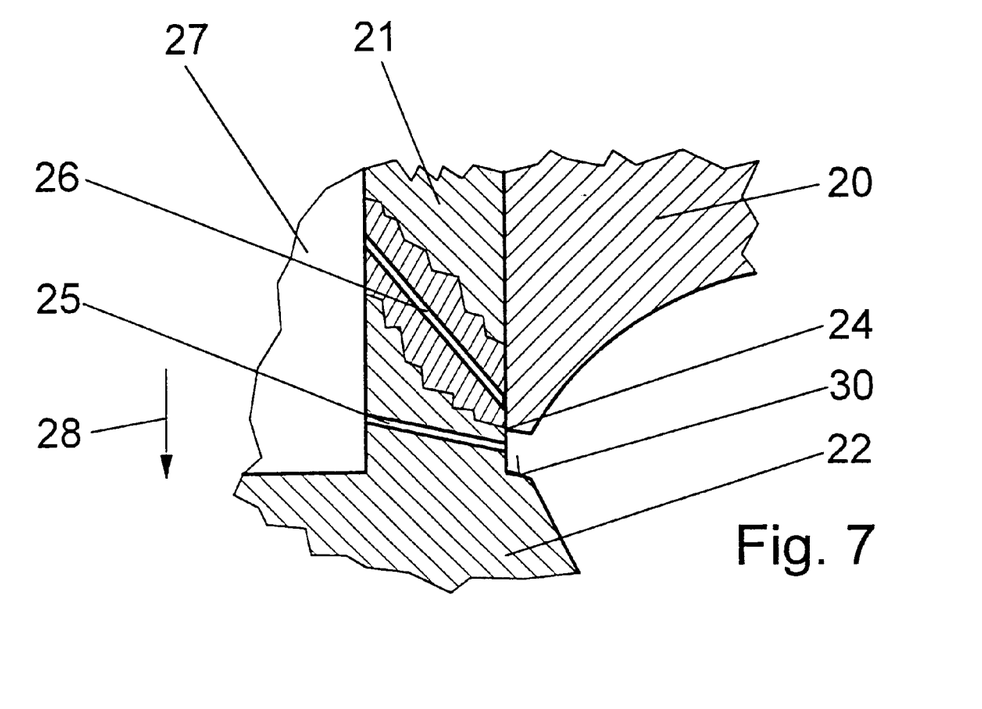
FIG. 7 shows a partial section through an injector nozzle in accordance with FIG. 6, in a semi-open state.

Injector nozzle 13 in accordance with FIGS. 6 and 7 has a nozzle body 20, in which a valve needle 21 is guided. This valve needle has a needle head 22 with a valve seat surface 30. Valve needle 21 opens outwardly in opening direction 28. In the closed state of injector nozzle 13, valve seat surface 30 engages on a valve seat 23 of nozzle body 20.

In the open state, a leading edge 24 clears nozzle orifices 25 and 26 in conformance with the stroke of valve needle 21, nozzle orifices 26 having a steeper angle β than nozzle orifices 25 which are more proximate to needle head 22. Moreover, nozzle orifices 26 open through, offset in the circumferential direction from nozzle orifices 25, so that their injection jets 18 and 19 do not obstruct one another.

Figure 11:
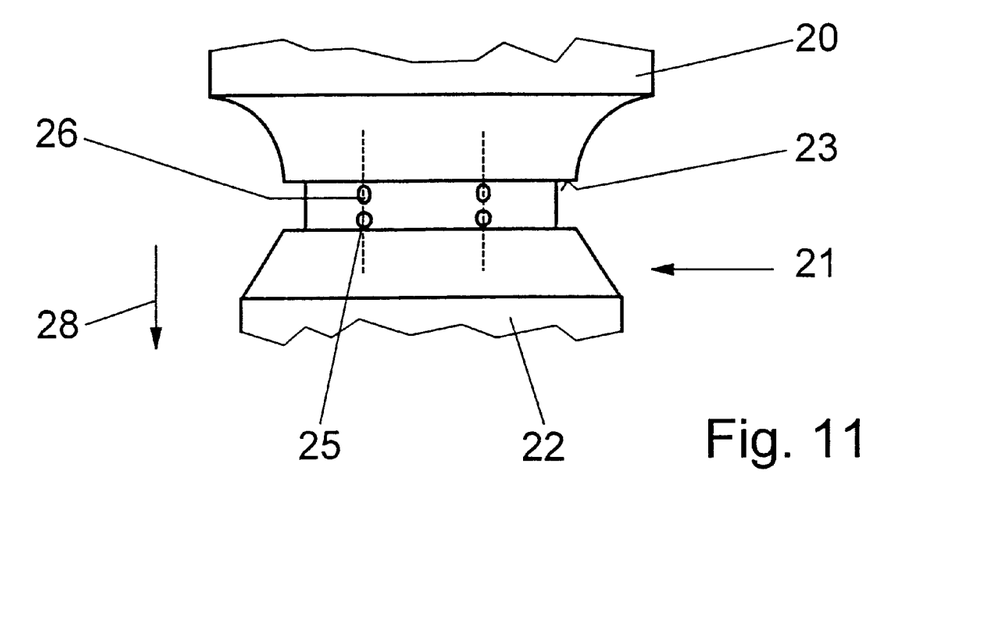
FIG. 11 shows a partial view of an injector nozzle having a plurality of nozzle orifices arranged one over the other in a line.
Figure 12:
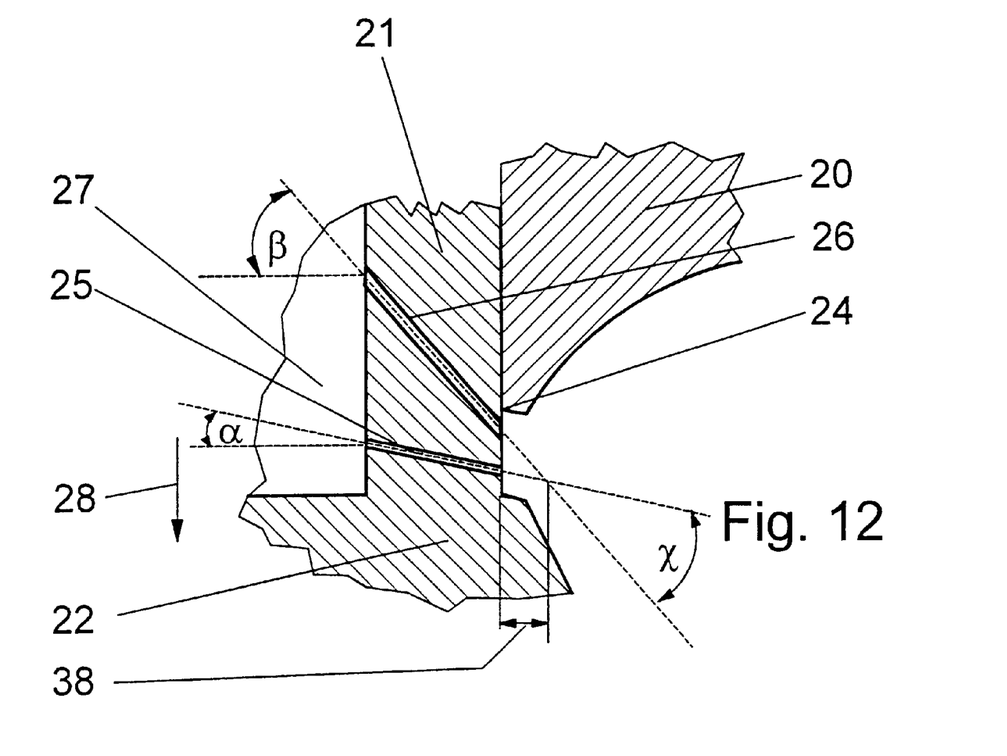
FIG. 12 shows a partial section through an injector nozzle according to FIG. 11, in a semi-open state.

In the second case, nozzle orifices 25, 26 are to be arranged without being offset from one another in such a way that injection jets 18, located above, are targeted to hit injection jets 17, located below, at a distance 38. The targeted collision of the two jets 17, 18 clearly reduces the absolute penetration depth of the fuel. This makes it possible to prevent fuel from accumulating at the wall, in the event of injection at early crank angles against low combustion chamber pressure. At the same time, once collision occurs, injection jet 17, 18 continues to break up perceptibly, so that smaller fuel droplets are formed and a larger air volume is covered.

The diameters of the lower and upper throttle orifices 25, 26 on the one hand, and the jet's cone of dispersion angle on the other hand, must be specifically adjusted to one another.

Figure 8:
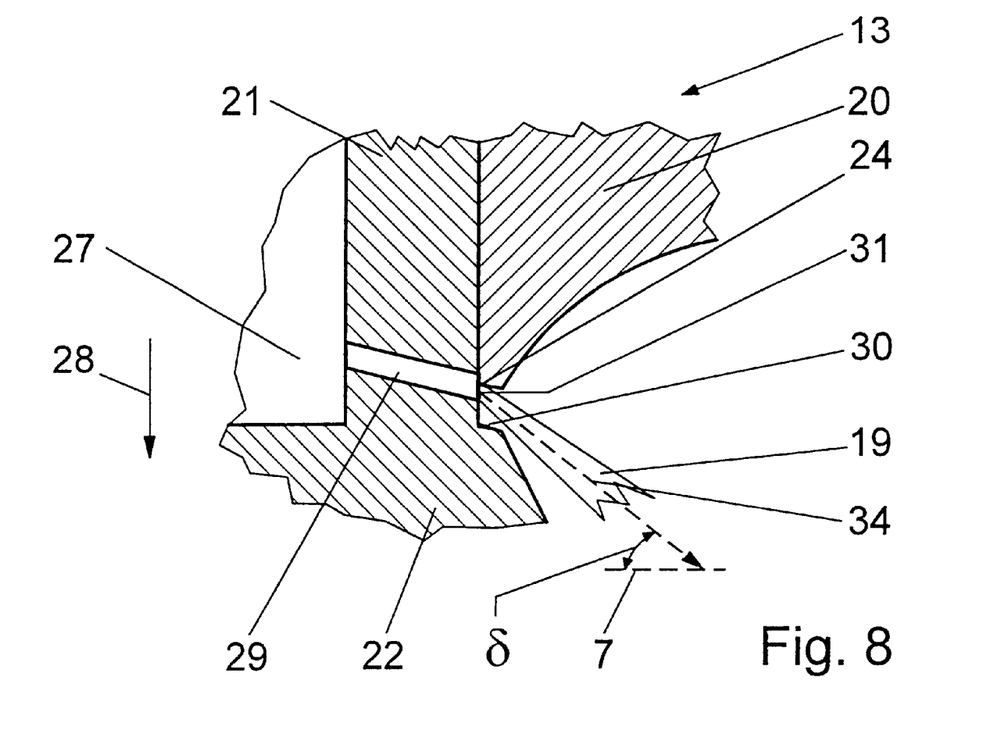
FIG. 8 shows a partial section through an injector nozzle having slit-type channels in a semi-open state.

Injector nozzle 13 in accordance with FIG. 8 has slit-type channels 29 distributed over the periphery. These slit-type channels join distributor chamber 27 to an orifice cross-section 31, 32, 33, which is elongated in opening direction 28, at the outer periphery of valve needle 21. A leading edge 24 on nozzle body 20 controls the extent to which orifice cross-section 31, 32, 33 is open, leading edge 24 deflecting an emergent injection jet 19 more toward piston crown 7 by increasingly covering orifice cross-section 31, 32, 33. In this manner, jet vector 34 of injection jet 19 forms an angle of inclination δ with respect to the piston crown that is dependent upon the opening stroke.

In the light part-load range 37 and in the heavy part-load range, i.e., in full-load 36, to form a heterogeneous mixture, the fuel is injected downwards, without jet deflection, with a flat angle in the area of top dead center 12, given a fully open orifice cross-section 31, 32, 33.

To form a homogenous mixture in the medium part-load range, orifice cross-section 31, 32, 33 is only partially cleared, resulting in a downwards jet deflection and a fine atomization of the fuel. In this context, the injection takes place within a range clearly before the top dead center 12. Intermittent actuation of valve needle 21 results in an optimal, homogenous distribution of the fuel over the air charge. In the full-load range, the fuel is injected in two phases and, in fact, in a first phase within a range of between 180° and 20° crank angle φ before the top dead center 12, to form a homogenous mixture, and in a subsequent range around the top dead center 12, to form a heterogeneous mixture. This makes it possible to burn a very large quantity of fuel with low emissions and in a manner that is free of combustion knocking.

Alternatively to the two-phase injection in the heavy part-load range or full-load range, in these load ranges, it is also possible to use a single-phase injection, i.e., all of the fuel is injected within the range of the top dead center, given fully open slits, to form a heterogeneous mixture.

Figure 9:
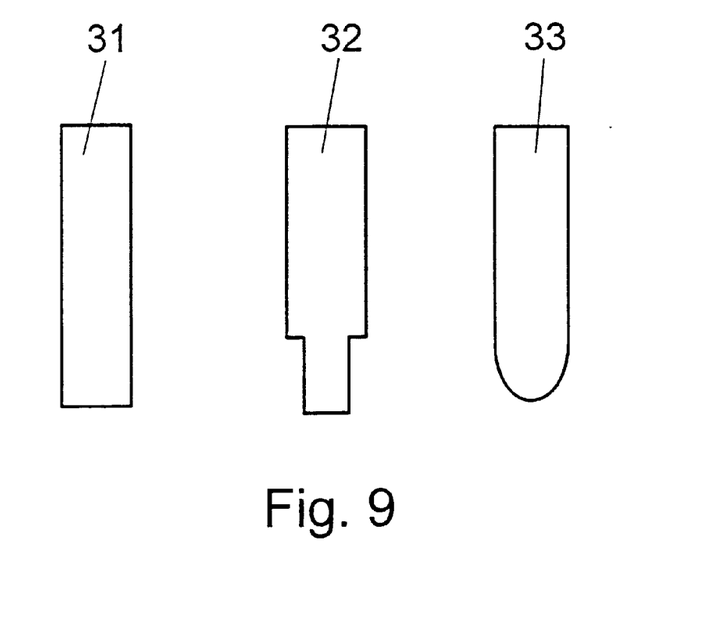
FIG. 9 shows several variants of orifice cross-sections of a slit-type channel.

FIG. 9 depicts various forms of orifice cross-sections 31, 32, 33.

What is claimed is:

1. A method for operating a reciprocating-piston internal combustion engine having an injector nozzle for directly injecting fuel into a combustion chamber and having a piston including a piston crown and a piston recess, the engine operating in a light part-load range, a part-load range, and a full load range, the method comprising:

during the light part-load range, injecting a first amount of the fuel centrally into the piston recess at a substantially flat first angle relative to a top surface of the piston crown at a time shortly before the piston reaches a top dead center position so as to produce a heterogeneous mixture;

during the part-load range, injecting a second amount of the fuel into the piston recess at least partly at a second angle steeper than the first angle relative to top surface of the piston crown at a time when the crank angle is within a range between 180° and 20° before the top dead center position so as to produce a homogeneous mixture; and during the full load range, injecting a portion of a third amount of the fuel into the piston recess at a steep and flat angle relative to the top surface of the piston crown at a time when the crank angle is within a range between 180° and 20° before the top dead center position so as to produce a homogeneous mixture and a remainder of the third amount of the fuel into the piston recess at a substantially flat angle relative to the surface of the piston crown at a time when the piston is approximately at the top dead center position so as to produce a heterogeneous mixture.

2. A method for operating a reciprocating-piston internal combustion engine having an injector nozzle for injecting fuel into the combustion chamber and having a piston including a piston crown and a piston recess, the engine operating in a light part-load range, a part-load range, a heavy part-load range and a full load range, the method comprising:

during the light part-load range, injecting a first amount of the fuel centrally into the piston recess at a substantially flat first angle relative to a top surface of the piston crown at a time shortly before the piston reaches a top dead center position so as to produce a heterogeneous mixture;

during the part-load range, injecting a second amount of the fuel into the piston recess at least partly at a second angle steeper than the first angle relative to the top surface of the piston crown at a time when the crank angle is within a range between 180° and 20° before the top dead center position so as to produce a homogeneous mixture; and during the heavy part-load and full load ranges, injecting a third amount of fuel centrally into the piston recesses at the substantially flat first angle relative to the top surface of the piston crown at a time shortly before the piston reaches a top dead center position so as to produce a heterogeneous mixture.

3. A method for operating a reciprocating-piston internal combustion engine having an injector nozzle operable by a single valve element and configured to directly inject a fuel into a combustion chamber and having a piston including a piston crown and a piston recess, the method comprising the steps of:

injecting the fuel by the injector nozzle into the combustion chamber in the form of separated jets of the fuel having different inclinations relative to a top surface of the piston crown; and selectively setting the inclinations of the fuel jets depending on an engine load.

4. A method for operating a reciprocating-piston internal combustion engine having an injector nozzle operable by a single valve element and configured to directly inject fuel into a combustion chamber and having a piston including a piston crown and a piston recess, the method comprising the steps of:

injecting the fuel by the injector nozzle into the combustion chamber in the form of separated fuel jets having different inclinations relative to a top surface of the piston crown; and selectively and adjustably setting the inclinations of the fuel jets depending on an engine load.

* * * * *